United States Patent [19]

Stonitsch

[11] Patent Number: 4,484,386
[45] Date of Patent: Nov. 27, 1984

[54] METHOD OF FIELD INSULATING PIPE JOINTS
[75] Inventor: Lawrence J. Stonitsch, Joliet, Ill.
[73] Assignee: Rovanco Corp., Joliet, Ill.
[21] Appl. No.: 438,030
[22] Filed: Nov. 1, 1982
[51] Int. Cl.³ .......................................... B21D 39/00
[52] U.S. Cl. .................................. 29/455 R; 29/157 R; 29/460; 156/245; 156/304.2; 156/313; 285/47; 285/286; 285/288; 264/46.5; 264/230
[58] Field of Search ............... 29/460, 455 R, 157 R; 156/245, 313, 304.2; 285/47, 53, 48, 138, 286, 288; 264/46.5, 230

[56] References Cited
U.S. PATENT DOCUMENTS

| | | | |
|---|---|---|---|
| 2,924,245 | 2/1960 | Wilson | 285/47 X |
| 3,453,716 | 7/1969 | Cook | 285/47 X |
| 3,645,564 | 2/1972 | Corriston | 285/47 |
| 3,731,710 | 3/1973 | Bauer et al. | 285/47 X |
| 3,793,411 | 2/1974 | Stonitsch | 264/46.5 |
| 3,949,461 | 4/1976 | Thastrup | 29/460 |
| 4,049,480 | 9/1977 | Kutschke | 264/46.5 X |
| 4,084,842 | 4/1978 | Stonitsch | 285/138 X |
| 4,221,405 | 9/1980 | Stonitsch | 285/53 |
| 4,363,681 | 12/1982 | Williams | 285/47 X |
| 4,441,743 | 4/1984 | Steenbergen | 285/47 X |

FOREIGN PATENT DOCUMENTS

| | | | |
|---|---|---|---|
| 2358614 | 2/1978 | France | 285/47 |
| 8100775 | 9/1982 | Netherlands | 285/47 |
| 1,235,776 | 6/1971 | United Kingdom | 285/47 |
| 1312831 | 4/1973 | United Kingdom | 285/47 |

Primary Examiner—Charlie T. Moon
Attorney, Agent, or Firm—Hill, Van Santen, Steadman & Simpson

[57] ABSTRACT

A method of making insulated pipe joints in the field. The method includes the steps of providing a rigid shroud which is larger than the fitting from fitting end to fitting end, welding a first pipe length to a first end of the fitting, moving the shroud over the fitting to project the second end of the fitting beyond the second end of the shroud, welding the second pipe length to the second end of the fitting, centering the shroud on the fitting, enclosing the gaps between the fitting shroud and the shrouds of the pipe lengths by mold members, pouring a foamable insulation into the space between the fitting and fitting shroud and into the gaps, setting the insulation, removing the molds to expose the gap areas, and thereafter applying a protective coating to the gaps which coating overlaps the fitting shroud and the pipe length shrouds.

3 Claims, 15 Drawing Figures

PRIOR ART
FIG. 1
PRIOR ART
FIG. 2
FIG. 3
FIG. 4
FIG. 5
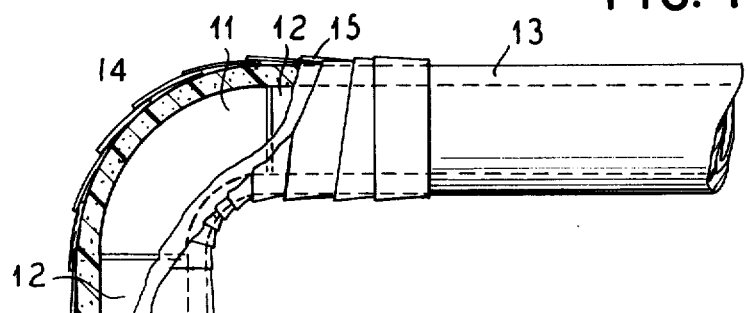
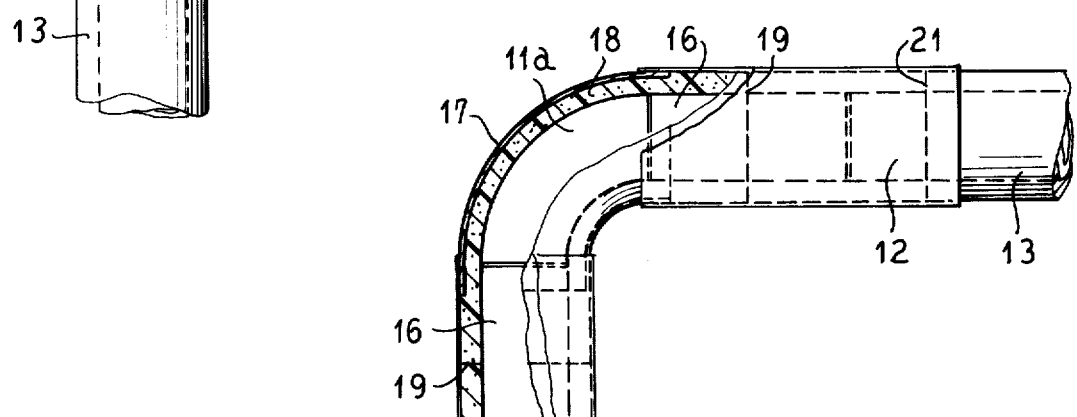
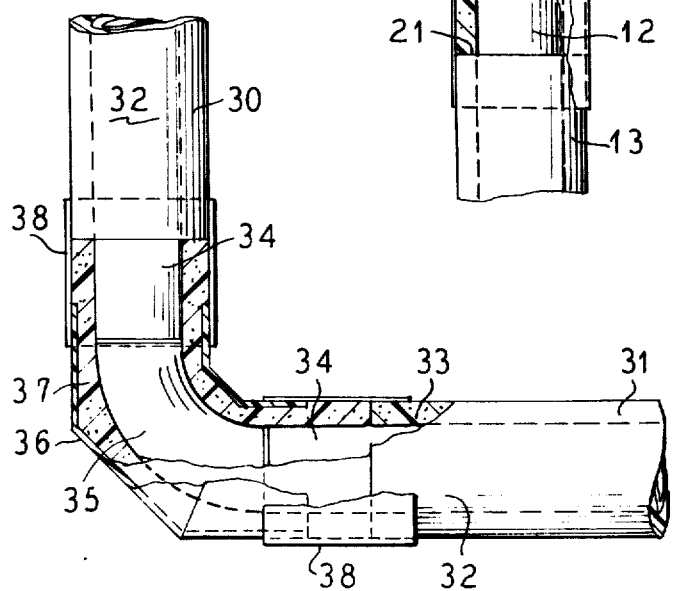
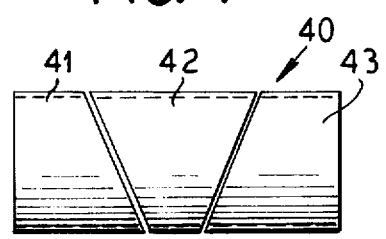
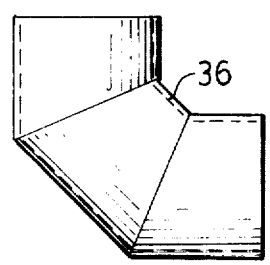

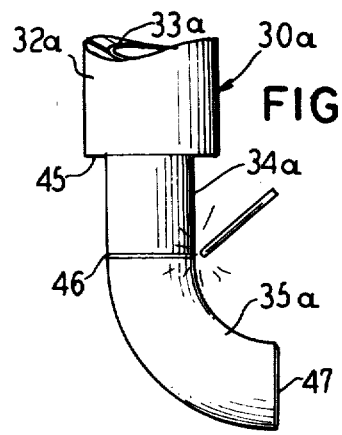
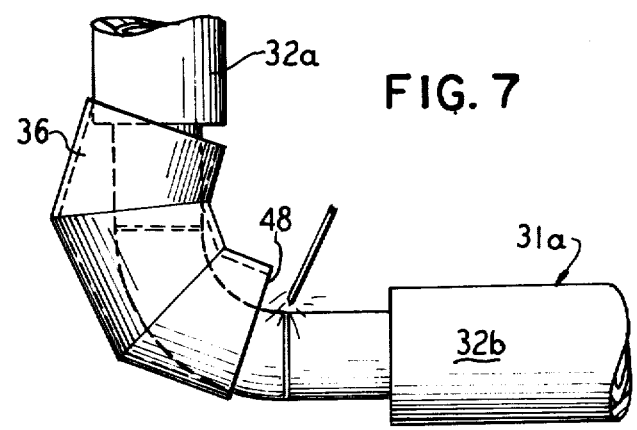
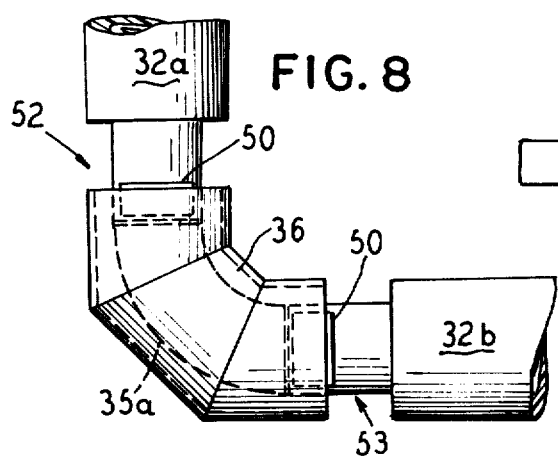
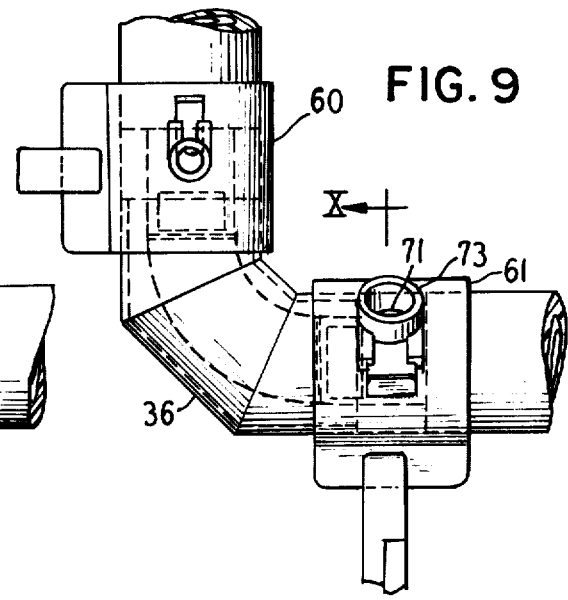
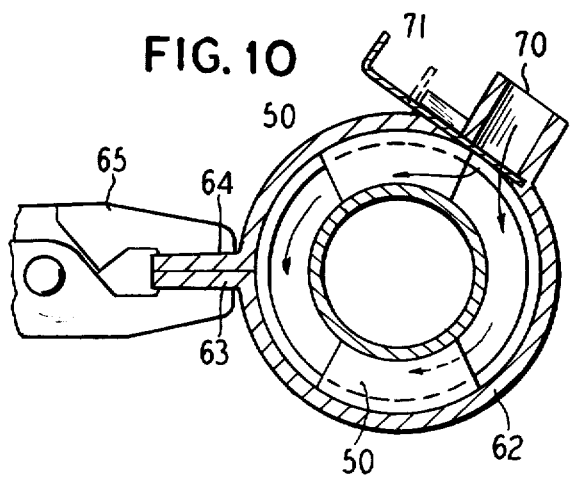
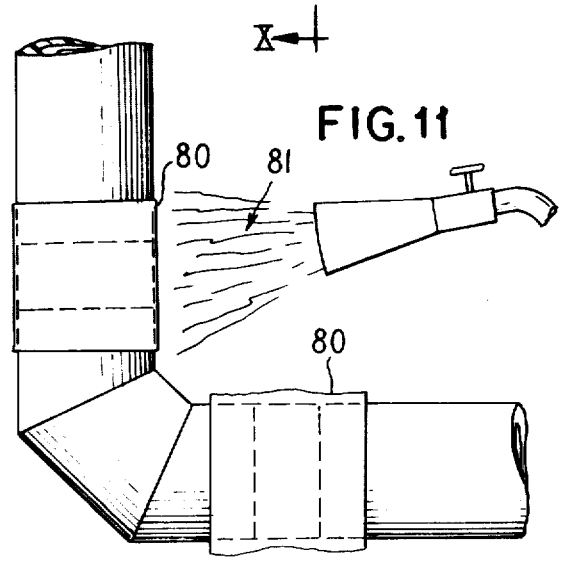

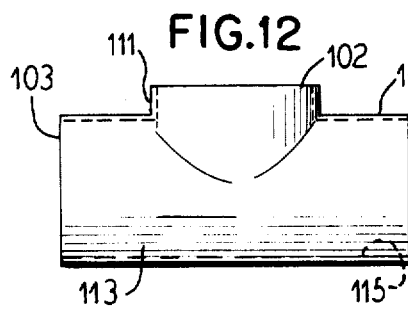
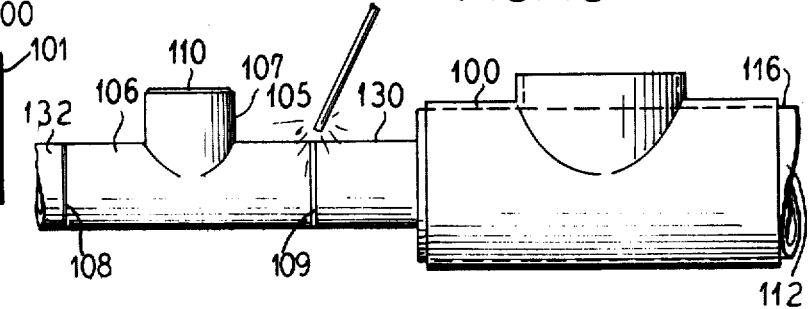
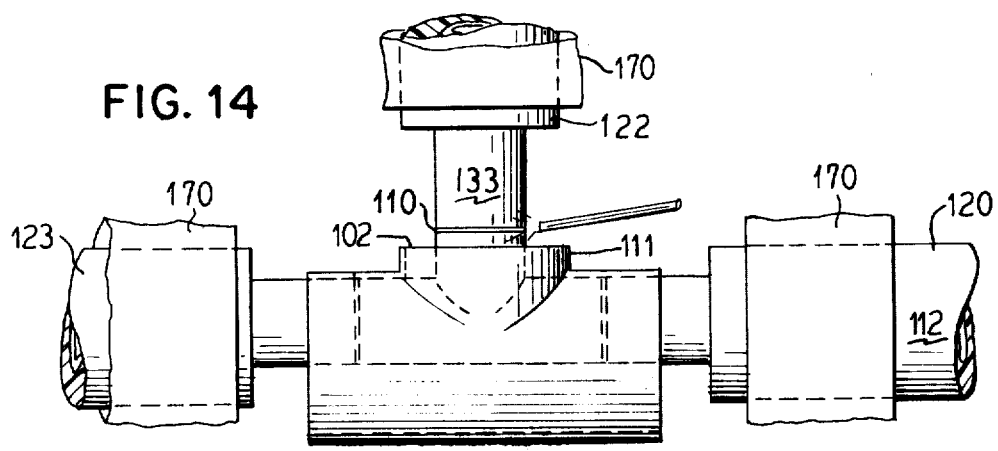
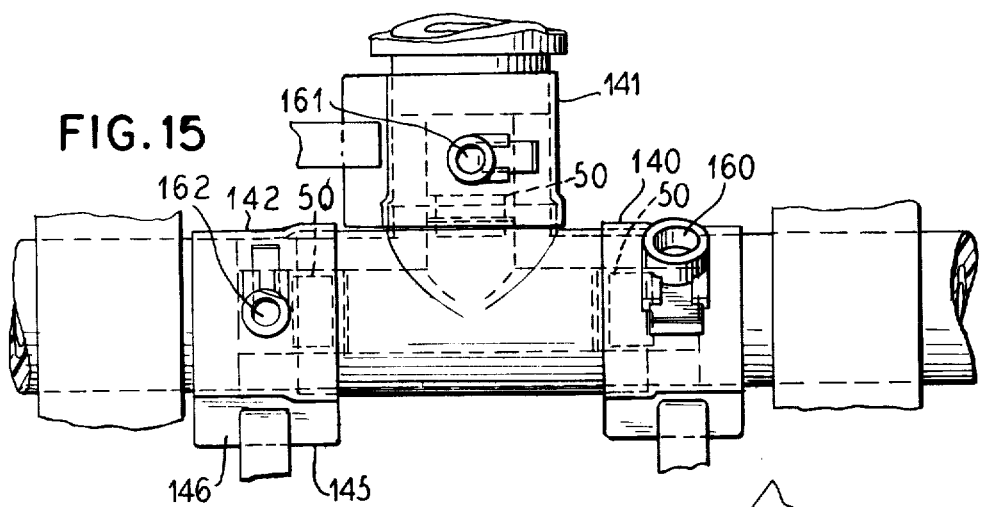
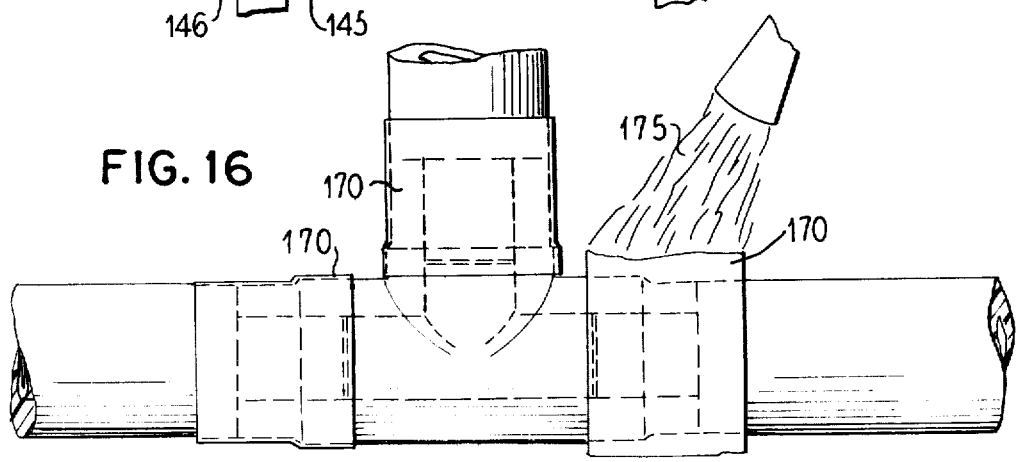

METHOD OF FIELD INSULATING PIPE JOINTS

BACKGROUND OF THE INVENTION

1. Field of the Invention

This invention relates to insulated piping, and more particularly to a method of applying fittings to insulated piping.

2. Prior Art

Insulated piping has found widespread industrial and commercial applications in recent years. A standard form of such insulated piping consists of individual lengths of factory insulated pipe assembly. These lengths consist of one or more inner pipes for carrying the media to be piped, an envelope of insulation material around the inner pipe and a shroud of protective material around the envelope of insulation. Standard piping today may include copper, steel or aluminum inner pipes, a rigid, closed or open celled foam insulation and an outer shell of plastic, such as PVC, polyethylene, or the like. These materials are assembled together in a factory by methods such as that disclosed in U.S. Pat. No. 3,793,411, issued to Lawrence J. Stonitch and Richard W. Stonitch on Feb. 19, 1974, the teachings of which are herein specifically incorporated by reference.

Factory completed insulated lengths are then field installed in appropriate piping configurations. In order to facilitate field insulation, such lengths are normally sent from the factory with inner piping portions projecting beyond the ends of the insulation envelope and protective outer shroud. Where lengths of piping are to be coaxially coupled with other lengths, various coupling arrangements have been suggested, such as, those shown in U.S. Pat. Nos. 4,084,842 and 4,221,405, issued to Lawrence J. Stonitch and Richard W. Stonitch, respectively, on Apr. 18, 1978 and Sept. 9, 1980, the teachings of which are also herein incorporated by reference.

One standard known method of connecting coaxial lengths together involves welding the ends of the inner pipes to one another, enclosing the gap between the ends of the insulation envelopes and shroud ends of the welded together pipe lengths, pouring foam into the interior of the enclosure and thereafter wrapping the foamed area either around the enclosure or after removal of the enclosure. The wrapping can be accomplished either by protective tape or by use of heat shrink materials.

While such methods work adequately for coaxial connections, they are not readily accepted for angle connections, including right angle connections, T-connections, 60° angle connections, etc. Such connections are commonly referred to in the trade under the generic term "fitting". In such angle connections, it is necessary to interpose a preformed pipe member having the desired angular shape. Such pipe member or "fitting" must then be welded to each of the straight lengths of insulated piping. This provides a relatively long span between the ends of the factory insulated pipe lengths. This span must be then field insulated. Heretofore, this has done in the field in the same manner. That is, an enclosure or mold form shaped to define the area around the fitting and between the ends of the shrouds of the premanufactured lengths would be clamped in place and attached to the length shrouds after welding up the fitting. Thereafter, the area interior of the mold and around the inner pipes and fitting would be filled with insulating foam, the enclosure would be removed and the resultant area tape wrapped to provide protection to the insulation. Such field joints, particularly those which are tape wrapped, are undesirable because they do not offer adequate protection to the insulation envelope or jacket at the high stress area of the fitting. It is preferred, in the trade, to provide a stronger protection at fittings than can effectively be provided by tape wrapping.

In order to provide the desired protection, it has known to pre-insulate fittings in the factory in substantially the same manner in which the straight lengths are preinsulated. However, since standard fittings are relatively short, in order to provide the necessary projection beyond the actual curve, it has been standard practice to weld onto the end of the fitting extension pipes prior to insulating in the factory. The fitting with the extension pipes is then assembled into a standard material shroud having a conforming shape to the fitting and the resultant assembly is then factory insulated. The extensions then project beyond the ends of the fitting shroud and beyond the ends of the factory insulation and connections are then made to the straight lengths in this standard manner in the field. This practice is a decided advantage over the field insulation of fittings in that better control of insulation density and quality can be obtained and the resultant angle joint is provided with a protective hard shroud. Such methods, however, are expensive in that they require costly factory sourced fittings which must be matched on site to the needs of the particular installation.

It would therefore be a definite advance in the art to develop a method of field installation of insulated pipe joints which provides the advantages of a protective hard shroud around the joint fitting while minimizing the number of welds necessary and avoiding the expense of using pre-insulated fittings.

SUMMARY OF THE INVENTION

My invention overcomes the disadvantages of prior art methods of field insulating fittings while retaining the advantages of factory insulated fittings without the necessity of purchasing factory insulated fittings.

Basically, my invention utilizes a preformed standard fitting together with a conforming preformed rigid shroud. The fitting, which is to connect two lengths of preinsulated piping may have a length less than the length of the preformed shroud. The fitting is first welded to one length and the shroud is thereafter slipped over the fitting and beyond the welded connection to a point where the opposite end of the fitting is accessable, projecting from the opposite end of the preformed shroud. The fitting is then welded to the second length. Thereafter, the preformed shroud is centered on the fitting and is retained in proper position thereon by use of spacers interposed between the inner diameter of the fitting shroud and the outer diameter of the fitting or the projecting ends of the pipe lengths. The gap areas between the shrouds on the pipe lengths and the fitting shroud are then covered by separate mold members, at least one of which is provided with a filling orifice. Foamable insulation material is then poured into the fitting orifice and flowed from the gap covered by the mold member having the filling orifice through the entire length of the fitting shroud and into the gap at the opposite end. Thereafter, the insulation material is allowed to foam to fill the entire cavity between the pipe, fitting and shroud and mold. Thereafter, the mold members are removed and the gap areas, now filled with insulation, are sealed by standard seal means.

Suprisingly, I have found in connection with standard preinsulated pipe having eight inches of projection of the pipe beyond the shroud and insulation at the end of the lengths, that this method can be practiced with a fitting shroud having an open end to open end length greater than the length of the fitting to be shrouded. This is because the fitting shroud can be moved beyond the first welded end up towards or beyond the end of the standard length shroud to a point where the opposite end of the fitting will be exposed adequately for on-site welding to the next length. By thereafter centering the fitting shroud before on sight foaming, it will be assured that the final joint will have the welds positioned interior of the rigid shroud. This method can be used not only in connection with simple angle fittings, such as right angle fittings, but also in connection with more complicated fittings, such as T-fittings.

In a preferred form of the embodiment, the mold members are simple circumferential clamp members formed of steel or plastic or the like, and each of the mold members is provided with an orifice. The orifices may be equipped with closure valves. By providing each mold member with an orifice, it is possible to properly determine when to stop filling with insulation. Standard used insulation material should, in order to provide the best insulation, be allowed to foam in the cavity and therefore the cavity should not be filled with insulation in its non-foamed state. By filling from one end, while observing over-flow at the other end, it is easy for the field operator to determine when adequate quantities of insulation have been poured into the joint area. Thereafter, by closing the valves for each mold member, the foam will set up within the cavity in a proper condition.

By use of standard straight length seal materials, primarily heat shrink plastics materials, a proven protection will be provided between the standard pipe lengths and the fitting shroud.

It is therefore a general object of this invention to provide an improved method of field insulating pipe fittings.

It is another and more specific object of this invention to provide an improved method of field insulating, insulated pipe fittings utilizing a rigid fitting shroud.

It is specific object of this invention to provide an improved method of field installing and insulating angle fittings in insulated piping lines utilizing standard fittings and providing a rigid fitting shroud with field applied foamed insulation between the pipe and the shroud.

Other objects, features and advantages of the invention will be readily apparent from the following description of a preferred embodiment thereof, taken in conjunctin with the accompanying drawings, although variations and modifications may be effected without departing from the spirit and scope of the novel concepts of the disclosure, and in which:

BRIEF DESCRIPTION OF THE DRAWINGS

FIG. 1 is a fragmentary partially sectional plan view of a prior art right angle fitting connection installed in the field.

FIG. 2. is a view similar to FIG. 1, illustrating another prior art method utilizing factory insulated fittings.

FIG. 3 is a view similar to FIGS. 1 and 2 illustrating the method of this invention.

FIG. 4 is a plan view of a first step in forming the shroud.

FIG. 5 is a plan view of the fitting shroud of this invention.

FIGS. 6 through 9 are sequential figures in the practice of this invention.

FIG. 10 is a fragmentary sectional view taken along the lines X—X of FIG. 9.

FIG. 11 is a view illustrating a final step in the practice of this invention.

FIG. 12 is a view similar to FIG. 5, illustrating a fitting shroud for use in T-joints.

FIGS. 13 through 15 are sequential steps in the practice of this invention in connection with a T-joint.

DESCRIPTION OF THE PREFERRED EMBODIMENTS

As illustrated in FIG. 1, standard prior art field installed fittings for insulated pipe consist of a standard fitting member 11 welded to the projecting pipe ends 12 of preinsulated piping lengths 13. Thereafter, insulation 14 is applied around the projecting pipe ends 12 and fitting 11 and the entire connection is enclosed in a tape 15.

FIG. 1 illustrates the use of a right angle fitting, however, it is to be understood that when the term "fitting" is used in this document, that it is intended to include substantially all standard angular fittings such as, for example, 45° fittings, 60° fittings, 90° fittings, T-fittings and the like, which are utilizeable in the practice of this invention. Further, when reference is made to pipe lengths herein, it is intended to refer to standard available factory preinsulated piping which generally consists of one or more inner metal pipes or conduits surrounded by an envelope or jacket of insulation which in turn is contained in a rigid cover, shell or shroud. Standard practice today involves the use of steel, copper, aluminum or alloy pipes, open or closed shell polyurethane, polystyrene or the like foamable rigid insulation and polypropelene, polybutalene, polyethylene, polyvinylchloride or the like rigid shrouds. It is to be understood herein that the term "rigid" when applied to either the insulation or the shroud is relative and that neither rigid foam nor a rigid shroud are unyielding or unelastic.

In the prior art method depicted in FIG. 1, a common practice is to provide mold members or shell members adapted to be temporarily clamped onto the shroud of the pipe lengths 13 and to define an enclosed cavity around the projecting pipes 12 and fitting 11. Such molds are provided with pour openings into which the mixed foam base can be poured. Pouring is usually done with the foam base in a non-foamed or only partially foamed state and after pouring, the foam is allowed to rise and cure or set. The mold halves or cover are then removed and the foam is inspected for quality and consistency in filling the void. Thereafter, the foam is coated with either a mastic or is wrapped with a tape. Such prior art methods are cost effective per fitting, have the advantage of requiring only two welds which can be made in the field, are versitile and do not require side storage of preinsulated fittings. However, such methods are deficient primarily in lack of foam consistency due to the fact that the foam is generally poured from a central single opening, and failure to adequately protect the fitting. Fittings are points of high stress in insulated pipe lines and neither masking nor taping provide a desired rigid shell.

FIG. 2 illustrates another standard prior art method. In the practice of this method, a standard fitting 11a is factory welded to pipe extensions 16. A rigid shroud 17 is then slipped over the extensions and fitting and is centered thereon by standard techniques, such as that discussed in the aforementioned U.S. Pat. No. 3,793,411. The foam insulation 18 is then provided, which terminates short of the end of the extension 16 as at 19. The preinsulated fitting is then assembled in the field and is welded to the projecting inner pipes 12. Thereafter, the gap areas between the ends 19 of the factory insulation of the fitting and the opposed ends 21 of the factory insulation and shrouds of the pipe lengths 13 is field insulated. Standard field insulation for straight connections of the type shown in FIG. 2, or where two lengths 13 are to be joined coaxially, involves the use of a tubular clamp having a pouring orifice therein. The clamp is applied from shroud to shroud, clamped in place and the foam is then poured around the joint. Thereafter, the clamp is removed and a protective cover is applied around the cured foam. Protective covers presently used include both tapeing and heat shrink plastics. Heat shrink plastics comprise either preformed tubes of heat shrinkable material or sheets of heat shrink material which are applied around the insulation, overlapping the shrouds on both sides of the joint and self-overlapping. Thereafter, heat is applied in the field either radiantly or by application of a propane torch to cause the material to shrink, forming an accepted cover. Strips of sealant may be used adjacent the axial ends of the heat shrink sheet. Such heat shrink material has proved very satisfactory and durable in practice. However, such heat shrink material cannot be readily used on joints since the material will not properly shrink to accept the curvature of the joint. Present used heat shrink material is generally treated to be substantially unidirectional in shrinkage, shrinking greater in circumference than longitudinally.

The method illustrated in FIG. 2 has a distinct recognized advantage over the method of FIG. 1 in that it does provide a heavy shroud at the critical bend area of the joint. Additionally, by utilizing standard heat shrink types of closure at the axial joint, the resultant assembly has proven watertight and effectively protected. However, the method illustrated in FIG. 2 requires costly factory preinsulated fittings, the matching of such preinsulated fittings on site, with resultant labor expenses, the occurrence of two additional wells to attach the extensions, and the necessity to stock and supply a large number of various preinsulated fittings.

FIG. 3 illustrates a fitting joint made according to the method of this invention. As in prior illustrated joints, first, 30, and second, 31 factory insulated pipe lengths are to be joined through a fitting 35. Each of the pipe lengths includes an outer shroud 32, an envelope of insulation 33 and an inner pipe 34. The shroud and insulation terminate short of the end of the inner pipe 34 such that the pipe 34 extends beyond the shroud and insulation envelope ends. The fitting 35 is a standard fitting and, when field installed, is surrounded by a shroud 36 which extends beyond both ends of the fitting. An envelope of insulation 37 is field formed from the insulation end of the length 30 to the insulation end of the length 31. Gap areas between the shroud 36 of the fitting and the shroud of the lengths are enclosed by protective material 38, which overlaps both the fitting shroud 36 and the length shroud 32.

Although the fitting shroud may, if desired, be preformed to the shape of the fitting, for right angle fittings it may be formed from butt welded lengths of standard shroud material. For example, as shown in FIG. 4, a section of standard shroud pipe 40, which may be, for example, PVC pipe, can be cut into three sections 41, 42 and 43, such that when the sections 41 and 43 are inverted, they can be butt welded to the ends of the center section 42 to form a right angle shroud as illustrated in FIG. 5, corresponding to the shroud 36 of FIG. 3. This type of butt welding of relatively thin wall PVC type shrouds cannot generally be accomplished in the field because of the necessity to maintain extreme accurate alignment between the members. However, standard process for such butt welding are well known to the trade and include, for example, the assembly of the parts in a jig which aligns them at their diameters while holding the parts slightly spaced apart, the heating of the ends of the two parts by heating plate which is thereafter removed, and the forced abutment of the heated and softened ends against one another in the jig to maintain alignment. Such plastic shroud butt welding techniques result in extremely good joining of the individual parts.

The field insulation method to be used with, for example, the shroud 36 shown in FIG. 5 is illustrated in FIGS. 6 through 11. As shown therein, a first pipe length 30a having an envelope of insulation 33a and an outer rigid shroud 32a with an extension of the inner pipe 34a projecting beyond the end faces 45 of the shroud 32a and insulation envelope 33a is first welded as at 46 to one end of a right angle fitting 35a. Thereafter, as illustrated in FIG. 7, the shroud 36 is slipped around the fitting 35a and pipe extension 34a to a point where the second end 47 of the fitting projects beyond the end face 48 of the fitting shroud. Preferably, the fitting shroud 36 has a diameter equal to the diameter of the shroud 32a of the first length and the shroud 32b of a second length of preinsulated piping, those shrouds having equal diameters. In spite of this, as is clearly shown in FIG. 7, it is possible to partially overlap the shroud 32a of the first length by the fitting shroud 36 to assist in moving the end 48 beyond the end 47 of the fitting 35a. With the end 47 thus projecting beyond the end 48, the second length 31a of preinsulated piping is welded to the end 47.

Thereafter, as shown in FIG. 8, the fitting shroud 36 is centered on the fitting 35a with the ends of the fitting interior of the ends of the fitting shroud. Centering is accomplished through the use of spacer blocks 50 which may be formed of cut blocks of insulation material. The spacers 50 center the fitting shroud 36 coaxially with the fitting 35a and therefore align the outer diameter of the fitting shroud 36 with the outer diameter of the shrouds 32a and 32b. Gap areas 52 and 53 will thus be provided between the ends of the fitting shroud 36 and the opposed and spaced ends of the lengths 30a and 31a. It will be appreciated that due to the particular manner of formation of the fitting shroud 36, the portions adjacent the end faces will be axially aligned and axially parallel to the shrouds 32a and 32b. This axial straightness of the portions is advantageous. As shown in FIGS. 9 and 10, after alignment of the fitting shroud 36 and centering on the fitting 35a, clamp mold members 60 and 61 are used to close the gaps 52 and 53. As shown in FIG. 10, the clamp members may consist of a band 62 open along the length thereof at one side. The band may be provided with flanges 63 and 64 for engagement by a clamp closure tool 65 which may be of the locking pliers type. The clamps 60 and 61 are attached to the shrouds by spreading them around the aligned fitting shroud and adjacent length shroud and thereafter clamping them in place. Preferably the clamps are dimensioned such that when clamped in place, a substantially fluid type joint will be made with the peripheries of the shrouds. The clamp overlaps both the fitting shroud and the length shrouds. Each clamp is provided with an orifice 70 and each orifice may be provided with a closure device or valve 71. In the embodiment illustrated, a simple slide closure is shown. One of the clamps, for example, clamp 61, would be designated as a pouring clamp and may have a large diameter neck 73 at the orifice 70.

Insulation of the fitting shroud proceeds then in the normal manner by pouring insulation in its un-foamed state into the pouring orifice. Pouring continues until insulation is noticed at the orifice of the other clamp. Thereafter, pouring is discontinued and both slides are closed. The insulation will then foam up and set. It will be noticed from FIG. 10 that the pouring orifice 70 may be located other than at the top. This is also true with regard to the orifice on the non-pouring clamp. By offsetting the orifice to a predetermined degree, and by using foaming insulation having a predetermined rise time, a desired density can be achieved. For example, by utilizing a insulation having a delayed rise time, and by setting the orifice at a position where insulation will be seen at or overflow the orifice when the fitting is only, for example, 60% full, then the desired density can be predetermined. Since the foam will have a known expansion capability, by determining that, prior to initiation of foaming, 60% of the available space (for example) will fill with the unfoamed insulating material, calculations can then be made as to the density of the final foam. For different desired density or for different foams, different locations can be used for the orifices. Further, the clamps can be made with a plurality of different spaced valved orifaces to allow field selection for density of foam variations. It can be seen that all of this can be done in the field without any complicated training.

After the desired time period has elapsed to set the insulation, the clamps 60 and 61 are removed and the resultant foam can be visually inspected in the gap areas. Thereafter, as illustrated in FIG. 11, heat shrink bands 80 can be wrapped around the gap areas 52 and 53, in the normal manner and thereafter shrunk by application of heat as shown at 81. This method is particularly adapted for use with heat shrink material because of the fact that the design of the fitting shroud provides the axially aligned peripheral surfaces which are axially straight so that both sides of the gap can be overlapped as illustrated.

As will be readily apparent to those skilled in the art, although I have thus far shown the practive of this invention in connection with a right angle fitting, the method is equally usable with other angle fittings. For example, in FIGS. 12 through 16, I have shown a method of practicing this invention with a T-fitting. In that instance, a fitting shroud 100 is provided having three ends, 101, 102, and 103 with 101 and 103 being axial ends and end 102 open normal to the axis. As illustrated in FIG. 13, standard right angle fittings 105 include an axial body 106 forming the main channel and a tubular boss 107 projecting normal to the axial body approximately midway between the axial body ends 108 and 109. The boss 107 terminates in an end 110.

It is normally desired to enclose all three weld lines, if possible, within the fitting shroud 100. In order to accomplish this, the fitting shroud 100 has ends 101 and 103 spaced apart a distance greater than ends 108 and 109 of fitting 105. In addition, end 102 of the right angle boss 111 projects beyond the outer periphery 112 of the main longitudinal body portion 113 of the fitting shroud 100 by a distance such that the end 102 is spaced from the axis of the main longitudinal body portion 113 a distance greater than the end 110 of boss 107 is spaced from the longitudinal axis of the body portion 106 of fitting 105.

Unlike the prior embodiments, in this instance, the fitting shroud 100 has a main inner diameter 115 which is slightly greater than the outer diameter 116 of the shrouds 117 of the opposed first, 120, and third, 123, lengths of preinsulated piping to be attached together through the fitting. The boss 111 on the other hand may have an inner and outer diameter mated to the inner and outer diameter of the shroud of the second length 122 which is to project normal to the axes of the first and third lengths. Alternatively, as shown in this particular set of drawings, the diameter of the boss 111 could also be larger, allowing identical clamps to be used to close all three gaps.

In the practice of this invention, the fitting shroud 100 is first slipped over the first length 120 as illustrated in FIG. 13. It will, of course, be understood that this can be done initially or it can be done after the fitting 105 is welded to the projecting end 130 of the first length, in which case the fitting shroud 100 will be axially slipped over both by then, attached fitting 105 and at least a portion of the first length. Thereafter, the projecting inner pipe 132 of the third length 123 is welded to the end 108 of the fitting and the fitting shroud is slipped back over the fitting. Because the inner diameter of the fitting shroud is much greater than the diameter of the inner pipes 130 and 132 and the fitting 105, the fitting shroud can be positioned offcenter of the axial line of pipe ends 130 and 132 such that the end 110 of fitting 105 will project beyond the end 102 of the fitting shroud. This allows access to end 102 for welding to inner pipe projection 133 of the second length 122.

After welding the second length to the fitting, the fitting shroud is centered on the fitting and the resultant gap areas betwen the ends of the shrouds of lengths 120, 122 and 123 and the opposed ends 101, 102, 103 of the fitting shroud are closed by clamps 140, 141 and 142 as shown in FIG. 15. Of course, centering is accomplished in substantially the same manner as in the prior example by use of spacer blocks 50. It should be noted that clamps 140–142 are provided, in this embodiment, with an enlarged diameter end 145 and a smaller diameter end 146. This accommodates the difference in diameters between the fitting shroud and the length shrouds.

After attachment of the clamps 140, 141, 142, the fitting and gap areas are filled with insulation in accordance with the prior description, it being understood that now there will be a filling opening 160, for example, in clamp 140, and two observation openings 161 and 162, one in each of clamps 141 and 142.

After cure, removal of the clamps and inspection of the insulation, the resultant insulation filled gap areas are sealed by standard sealing procedures. It will be appreciated, that in FIGS. 14 and 15, I have shown the use of tubular heat shrink material 170 which, if used in place of spiral wrapped heat shrink material, will be positioned on the lengths prior to welding. Such tubular heat shrink material is then positioned over the gap areas as shown in FIG. 116 and is subjected to a heat source 175 to shrink the material into snug engagement with both the fitting shroud end portions and the opposed lengths.

It will therefore be seen that my invention provides a method of field installing and insulating fittings in insulated pipe assemblies where the field installed fitting includes a rigid shroud member enclosing the fitting. The shroud member is field insulated and the gaps between the fitting shroud and the length shrouds are closed by standard available techniques.

Although the teachings of my invention have herein been discussed with reference to specific theories and embodiments, it is to be understood that these are by way of illustration only and that others may wish to utilize our invention in different designs or applications.

I claim as my invention:

1. The method of making field installed insulated and shrouded pipe joints comprising the steps of:
   a. providing first and second lengths of insulated and shrouded pipe, each having an end to be joined to an end of the other length with the ends disposed at an angle to one another, the length comprising an inner pipe, an envelope of rigid foamed insulation surrounding the inner pipe and an outer protective shroud surrounding the envelope of insulation,
   b. projecting the inner pipe beyond the end of the envelope of insulation and beyond an end of the shroud,
   c. providing an angle pipe fitting having first and second ends disposed at an angle to one another adapted to be connected to the ends of the lengths,
   d. welding a first end of one of the lengths to a first end of the fitting,
   e. providing a fitting shroud having first and second ends spaced apart less than the spacing of the ends of said outer shrouds from one another when said lengths are attached to said fitting, said fitting shroud having a shape adapted to receive the fitting interiorly thereof and an inner diameter greater than the outer diameter of the fitting,
   f. inserting the fitting into the fitting shroud and beyond the weld of the first end to a point where the second end of the fitting projects beyond the fitting shroud,
   g. welding a first end of the other of the first and second lengths to the second end of the fitting,
   h. centering the fitting shroud in spaced relation around the fitting with the first and second ends of the fitting shroud spaced from the ends of the envelope of insulation and the end of the shroud of the first and second lengths to provide gaps between the fitting shroud and said ends of said first and second lengths,
   i. attaching mold members to the fitting shroud and length shrouds spanning and enclosing the gaps, at least one mold member having a filling orifice,
   j. flowing a settable foaming insulation material in a non-set state through said orifice and into the area between the fitting shroud and fitting and into the gaps,
   k. setting the foaming material and filling the area and gaps with foamed insulation,
   l. removing the mold members and exposing the foamed insulation in the gaps,
   m. and thereafter enclosing the foamed gaps with protective material which overlaps the fitting shroud and length shrouds.

2. The method of claim 1, including the additional steps of: providing a T-shaped fitting, providing a third length of insulated shrouded pipe, the fitting shroud being provided with an inner diameter greater than the outer diameter of the shroud of at least one of the lengths, sliding the fitting shroud over the shroud of the said one of the lengths subsequent to welding the first end of said one of the lengths to expose an opposite third end of said fitting projecting beyond an end of the fitting shroud, welding the third end of said fitting to an end of said third length, repositioning said fitting shroud over said fitting to project the second end of the fitting beyond the second end of the fitting shroud, welding the second end of the fitting to the first end of said other of the first and second lengths, centering the fitting shroud in spaced relation around the fitting with the first, second and third ends of the fitting shrouds spaced from the end of the envelope of insulation and end of the shroud of the first, second and third lengths to provide three gaps, attaching three mold members to the fitting shroud and length shrouds spanning and enclosing the three gaps.

3. The method of claim 2, wherein the steps of flowing, setting, removing and enclosing include all three gaps.

* * * * *